United States Patent
Jiang et al.

(10) Patent No.: US 10,242,295 B2
(45) Date of Patent: Mar. 26, 2019

(54) METHOD AND APPARATUS FOR GENERATING, UPDATING CLASSIFIER, DETECTING OBJECTS AND IMAGE PROCESSING DEVICE

(71) Applicant: CANON KABUSHIKI KAISHA, Tokyo (JP)

(72) Inventors: Long Jiang, Beijing (CN); Yong Jiang, Beijing (CN); Wenwen Zhang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 15/152,375

(22) Filed: May 11, 2016

(65) Prior Publication Data

US 2016/0335521 A1 Nov. 17, 2016

(30) Foreign Application Priority Data

May 14, 2015 (CN) .......................... 2015 1 0244526

(51) Int. Cl.
*G06K 9/00* (2006.01)
*G06K 9/38* (2006.01)
*G06K 9/62* (2006.01)

(52) U.S. Cl.
CPC .......... *G06K 9/628* (2013.01); *G06K 9/00711* (2013.01); *G06K 9/38* (2013.01); *G06K 9/627* (2013.01); *G06K 9/6223* (2013.01)

(58) Field of Classification Search
None
See application file for complete search history.

(56) References Cited

U.S. PATENT DOCUMENTS

| | | | | |
|---|---|---|---|---|
| 9,652,694 B2 * | 5/2017 | Jiang | ................... | G06K 9/6284 |
| 2005/0249401 A1 * | 11/2005 | Bahlmann | ............ | G06K 9/6228 |
| | | | | 382/159 |
| 2009/0154814 A1 * | 6/2009 | Natan | ................... | G06K 9/468 |
| | | | | 382/224 |

(Continued)

FOREIGN PATENT DOCUMENTS

| | | |
|---|---|---|
| CN | 102129572 A | 7/2011 |
| CN | 102436589 A | 5/2012 |

(Continued)

OTHER PUBLICATIONS

An overview of ensemble methods for binary classifiers in multi-class problems: Experimental study on one-vs-one and one-vs-all schemes . Galar et al. 2011.*
Semi-Supervised On-line Boosting for Robust Tracking. Grabner et al. 2008.*
Grabner, et al., "Semi-Supervised On-line Boosting for Robust Tracking", Computer Vision—ECCV 2008, 10th European Conference on Computer Vision, Marseille, France, Oct. 12-18, 2008, Proceedings, Part I, vol. 5302 of the series Lecture Notes in Computer Science pp. 234-247.

Primary Examiner — Delomia L Gilliard
(74) Attorney, Agent, or Firm — Canon U.S.A., Inc. I.P. Division

(57) ABSTRACT

The present invention relates to method and apparatus for generating, updating classifier, detecting objects, and image processing device. A method for generating a multi-class classifier, comprising the following steps: generating at least one one-class background classifier by using a one-class object classifier and background image regions obtained from a sequence of images; and assembling the one-class object classifier and the at least one one-class background classifier into a multi-class classifier.

22 Claims, 10 Drawing Sheets

(56) References Cited

U.S. PATENT DOCUMENTS

| | | | | |
|---|---|---|---|---|
| 2011/0293136 A1* | 12/2011 | Porikli | ............... | G06K 9/00771 |
| | | | | 382/103 |
| 2011/0302111 A1* | 12/2011 | Chidlovskii | ......... | G06N 99/005 |
| | | | | 706/12 |
| 2012/0089545 A1* | 4/2012 | Mei | ...................... | G06K 9/6257 |
| | | | | 706/20 |
| 2012/0250983 A1* | 10/2012 | Meng | ................... | G06K 9/6263 |
| | | | | 382/159 |
| 2014/0254863 A1* | 9/2014 | Marks | ............... | G06K 9/00771 |
| | | | | 382/103 |
| 2015/0054824 A1* | 2/2015 | Jiang | .................... | G06K 9/6284 |
| | | | | 345/420 |
| 2016/0162757 A1* | 6/2016 | Chen | ........................ | G06T 3/20 |
| | | | | 382/159 |
| 2016/0335521 A1* | 11/2016 | Jiang | ..................... | G06K 9/628 |

FOREIGN PATENT DOCUMENTS

| | | | |
|---|---|---|---|
| CN | 102915450 A | 2/2013 | |
| CN | 102999760 A | 3/2013 | |
| CN | 103294716 A | 9/2013 | |
| CN | 104424466 A | 3/2015 | |
| CN | 104504392 A | 4/2015 | |
| EP | 2833295 A2 | 2/2015 | |
| WO | WO 2016178243 A1 * | 11/2016 | ............. G06K 9/628 |

* cited by examiner

METHOD AND APPARATUS FOR GENERATING, UPDATING CLASSIFIER, DETECTING OBJECTS AND IMAGE PROCESSING DEVICE

CROSS-REFERENCE TO RELATED APPLICATIONS

This application claims the benefit of Chinese Patent Application No. 2015-10244526.9, filed May 14, 2015, which is hereby incorporated by reference herein in its entirety.

BACKGROUND OF THE INVENTION

Field of the Invention

The present invention generally relates to the field of image processing, and more particularly, relates to method and apparatus for generating a multi-class classifier, method and apparatus for updating a multi-class classifier, method and apparatus for detecting objects as well as image processing device.

Description of the Related Art

Object detection as a main research aspect in computer vision has achieved considerable development in last few decades. Most of methods rely on collecting plenty of positive and negative samples for learning a binary-class classifier to identify objects and non-objects. But in some applications such as general object detection, image retrieval etc., they may be invalid because it is difficult to collect plenty of samples in advance.

One common solution is to learn a one-class classifier by one or few positive samples to distinguish objects from all other possible objects when user has given the object samples. One main problem of the one-class classification is that, in comparison to other solutions such as binary-class or multi-class classification, objects may be weakly discriminated, because no contrast samples could be used. Thus, it will result in high false detection rate.

For solving this problem, some methods based on background modeling were proposed. If some negative samples can be collected from background image regions, object detection may be treated as a binary classification task to distinguish objects from background, which can improve the classification accuracy under current background. Most of methods in current literatures, for example, the method given by a paper titled "Semi-Supervised On-line Boosting for Robust Tracking" (Helmut Grabner, Christian Leistner, and Horst Bischof. ECCV, 2008), are to learn a binary-class classifier by object samples and background samples firstly, and then to update the classifier by newly collected samples.

However, this kind of method cannot be used in some applications, for an example, shooting a running dog with a hand-hold camera, since there exist several issues in the prior art.

For an example, one issue lies in that, it needs to learn a binary-class classifier from object samples and background samples. When the background information cannot play a positive role (for an example, the object goes into an absolutely different scene), it cannot remove background classifier freely.

For another example, another issue lies in that, the learned binary-class classifier is only suitable for the fixed background or slowly changing background. If the background changes suddenly, it could not achieve very good results in object detection.

SUMMARY OF THE INVENTION

In view of the above, there are issues expected to be solved in the prior art. The present invention aims to solve the issues as described above. An object of the present invention is to provide a method and apparatus to address any of the above issues.

Specifically, in order to solve such issues, the present invention provides a novel method based on background modeling.

Firstly, in the present invention, it may generate an assembled multi-class classifier which includes a one-class object classifier and several one-class background classifiers, and this is totally different from conventional binary-class and multi-class classifiers, since a conventional multi-class classifier is a sole classifier, that is to say, it is constituted by only a classifier, and not constituted by multiple individual one-class classifiers. Further, in the present invention, the multiple classifiers are independent of each other. In other words, in the present invention, the multiple classifiers are not mutually affected after being generated and each of them can perform classification independently and individually.

Moreover, since the respective classifiers composing the multi-class classifier are not mutually affected after being generated and each of them can perform classification independently and individually, it is possible to change the constitution or configuration of the multi-class classifier so as to better suit the scenes. Thus, by using such generated multi-class classifier, higher classification accuracy will be obtained.

Secondly, in the present invention, it may update a multi-class classifier which is generated by assembling a plurality of one-class classifiers including a one-class object classifier and at least one (one or more) one-class background classifiers, based on some new samples.

The updating of the multi-class classifier may adapt to the change of scenes and thus may readily improve the classification accuracy.

Thirdly, in the present invention, it may freely add or remove any one-class classifier in a multi-class classifier which includes a one-class object classifier and several one-class background classifiers which are independent of each other.

As mentioned above, since the respective classifiers, which compose the multi-class classifier, are not mutually affected after being generated and each of them can perform classification independently and individually, it is possible to change the constitution or configuration of the multi-class classifier. Specifically, for example, the constitution or configuration of the multi-class classifier may be changed by adding or removing one or more one-class classifiers (which may be object classifier or background classifiers).

So, the present invention is not only suitable for the fixed background or slowly changing background, but also it is suitable for the suddenly changing background. Therefore, it can achieve better results in object detection and/or image processing.

According to an aspect of the present invention, there is provided a method for generating a multi-class classifier, comprising the following steps: generating at least one one-class background classifier by using a one-class object classifier and background image regions obtained from a sequence of images; and assembling the one-class object classifier and the at least one one-class background classifier into a multi-class classifier.

Here, the above one-class object classifier may be an existing one-class object classifier, and it may also be generated before the step of generating at least one one-class background classifier.

In addition, an illustrative method of generating at least one one-class background classifier comprising: selecting background samples from background image regions using a one-class object classifier; clustering the selected background samples into at least one set of background samples; and generating a one-class background classifier for each set of background samples.

As an example, the method of selecting background samples from background image regions using the one-class object classifier may comprise: sliding a search window in at least one scale across each of the background image regions and having the content in the background image region which is defined by the search window as a background sample; sorting the background samples, based on the distances between the respective background samples and the one-class object classifier; and selecting background samples based on the sorting results of the background samples.

According to another aspect of the present invention, there is provided a method for updating a multi-class classifier, the multi-class classifier is generated by assembling a plurality of one-class classifiers which comprise a one-class object classifier and at least one one-class background classifier, the method comprising the following steps: with respect to each one-class classifier among the plurality of one-class classifiers, selecting samples from newly added samples as candidate updating samples of this one-class classifier; and updating each of the one-class classifiers by using its corresponding candidate updating samples.

It is to be noted that, the above multi-class classifier to be updated may be such multi-class classifier as disclosed in the present invention, and it may also be other appropriate multi-class classifier.

Here, with respect to each one-class classifier, candidate updating samples may be selected for this one-class classifier from newly added samples, based on the distances between the respective newly added samples and the one-class classifier, for example.

Further, in the present invention, preferably, at least one new one-class classifier may be generated by using the samples among the newly added samples which are not candidate updating samples of the respective one-class classifiers. In addition, the generated at least one new one-class classifier may be added to the multi-class classifier.

On the other hand, in the present invention, preferably, invalid one-class classifiers may be removed from the multi-class classifier. Here, said invalid one-class classifiers may comprise the ones among the plurality of one-class classifiers which are less suitable for new scenes, for example.

According to yet another aspect of the present invention, there is provided a method for detecting objects, comprising the following steps: generating a multi-class classifier by assembling a one-class object classifier and at least one one-class background classifier which can perform classifying independently of each other; and detecting objects in images by using the multi-class classifier.

Here, the above multi-class classifier may be generated by using the method for generating a multi-class classifier according to the present invention. But, the present invention does not limit to this.

In addition, the above multi-class classifier may be updated by using the method for updating a multi-class classifier according to the present invention. But, the present invention does not limit to this.

Further, in the present invention, it is preferable to collect new object samples and background samples from a sequence of images so as to select samples from the new object samples and background samples as newly added samples, and then update the multi-class classifier based on the newly added samples. For example, the method of collecting new object samples and background samples from a sequence of images so as to select samples from the new object samples and background samples as newly added samples may comprise: sliding a search window in at least one scale across an image and having the content in the image which is defined by the search window as a new sample; sorting the new samples, based on the distances between the respective new samples and the one-class object classifier; and selecting samples from these new samples as the newly added samples, based on the sorting results of these new samples.

According to yet another aspect of the present invention, there is provided an apparatus for generating a multi-class classifier, the apparatus comprising: background classifier generating unit, which is configured to generate at least one one-class background classifier by using a one-class object classifier and background image regions obtained from a sequence of images; and assembling unit, which is configured to assemble the one-class object classifier and the at least one one-class background classifier into a multi-class classifier.

According to yet another aspect of the present invention, there is provided an apparatus for updating a multi-class classifier, the multi-class classifier is generated by assembling a plurality of one-class classifiers which comprise a one-class object classifier and at least one one-class background classifier, the apparatus comprising: sample selecting unit, which is configured to, with respect to each one-class classifier among the plurality of one-class classifiers, select samples from newly added samples as candidate updating samples of this one-class classifier; and one-class classifier updating unit, which is configured to update each of the one-class classifiers by using its corresponding candidate updating samples.

Preferably, the above apparatus for updating a multi-class classifier may further comprise: new one-class classifier generating unit, which is configured to generate at least one new one-class classifier by using the samples among the newly added samples which are not candidate updating samples of the respective one-class classifiers; and adding unit, which is configured to add the at least one new one-class classifier generated by the new one-class classifier generating unit to the multi-class classifier.

In addition, the above apparatus for updating a multi-class classifier may further comprise removing unit which is configured to remove invalid one-class classifiers from the multi-class classifier.

According to yet another aspect of the present invention, there is provided an apparatus for detecting objects, the apparatus comprising: generating unit, which is configured to generate a multi-class classifier by assembling a one-class object classifier and at least one one-class background classifier which can perform classifying independently of each other; and detecting unit, which is configured to detect objects in images by using the multi-class classifier.

According to yet another aspect of the present invention, there is provided an image processing device, comprising the apparatus for detecting objects according to the present invention.

In the present invention, novel method and apparatus for generating a multi-class classifier, novel method and apparatus for updating a multi-class classifier, and novel method and apparatus for detecting objects as well as novel image processing device are provided, which are not only suitable for fixed background or slowly changing background, but also suitable for the suddenly changing background. Therefore, by using the present invention, excellent results can be achieved in object detection and/or image processing.

Moreover, in the present invention, it can not only update each one-class classifier in a multi-class classifier composed of a plurality of independent one-class classifier, but also update the whole multi-class classifier, by newly adding samples. In this manner, the present invention can significantly improve classification accuracy, and thus enhance recall rate and decrease false detection.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention. In the figures, similar reference numerals are used for denoting similar items.

Some embodiments of the invention are described with respect to the following figures.

DESCRIPTION OF THE EMBODIMENTS

It should be noted that the following embodiments are not intended to limit the scope of the appended claims, and that not all the combinations of features described in the embodiments are necessarily essential for solving the technical problem of the present invention. Each of the embodiments of the present invention described below can be implemented solely or as a combination of a plurality of the embodiments or features thereof where necessary or where the combinations of elements or features from individual embodiments in a single embodiment are beneficial.

In the disclosure, it is possible to carry out each unit, component and/or assembly of the apparatuses of the present invention, through software, hardware, firmware or any combination thereof. In addition, it is possible to carry out the methods according to the present invention through software, hardware, firmware or any combination thereof. That is to say, the methods and apparatuses of the present invention are not limited by the manners of implementing them, and the protected scope of the present invention is only defined by the attached claim set.

Moreover, in the disclosure, it is not necessary to perform the steps in the order as illustrated by the flowcharts and as mentioned in the embodiments, and the order of the steps is very flexible depending on the actual situations. That is to say, the present invention shall not be limited to the orders of performing the steps as illustrated in the exemplary flowcharts.

The illustrative embodiments of the present invention will be described in detail below with reference to the drawings.

Figure 1:
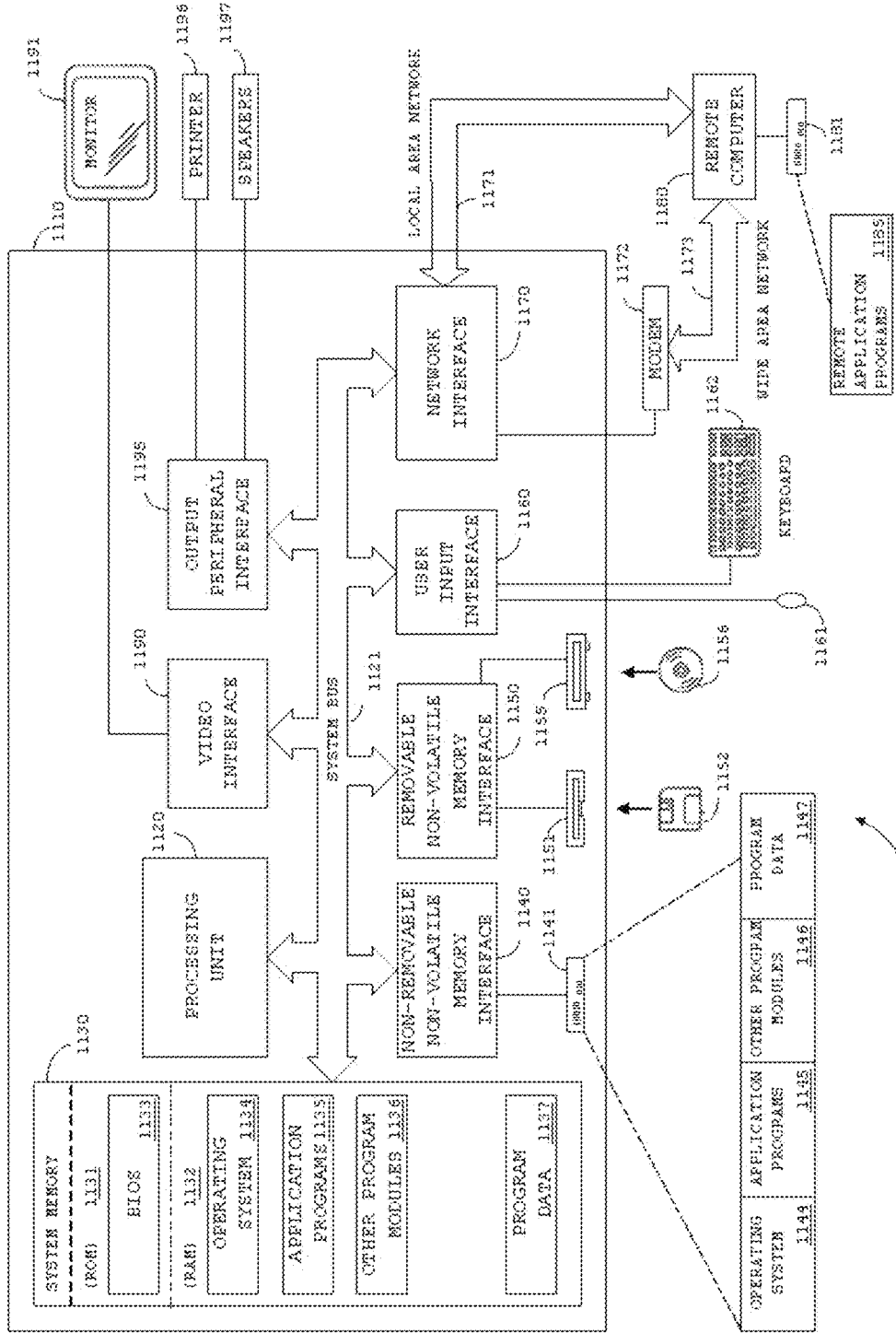
FIG. 1 is a block diagram exemplarily illustrating a configuration of a computing device for implementing method and apparatus according to embodiments of the present invention.

First, FIG. 1 is a block diagram showing an exemplary hardware configuration of a computer system 1000 which can implement the embodiments of the present invention.

As shown in FIG. 1, the computer system 1000 comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132. A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example. Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such as a microphone 1161 and a keyboard 1162, are connected to the user input interface 1160.

The computer 1110 can be connected to a remote computer 1180 by a network interface 1170, for example. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185. The video interface 1190 is connected to a monitor 1191. The output peripheral interface 1195 is connected to a printer 1196 and speakers 1197.

The computer system 1000 as shown in FIG. 1 is merely illustrative and is in no way intended to limit the invention, its application, or uses.

The computer system shown in FIG. 1 may be implemented to any of the embodiments, either as a stand-alone computer, or as a processing system in an apparatus, possibly with one or more unnecessary components removed or with one or more additional components added.

Figure 2:
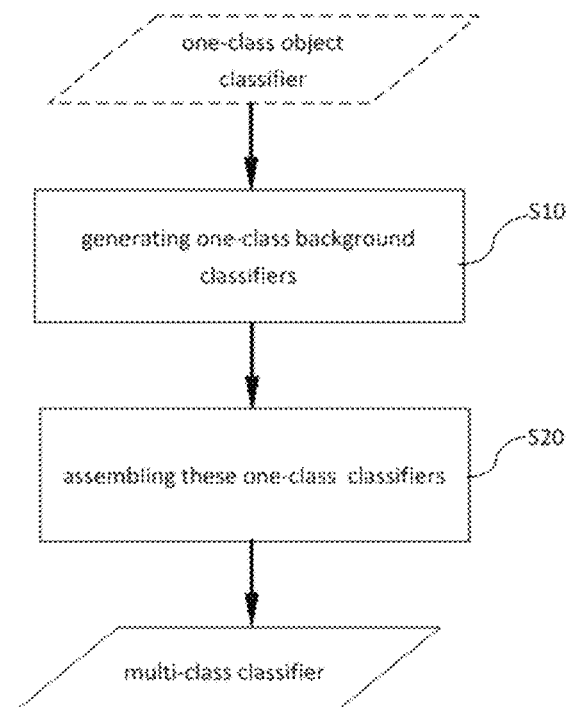
FIG. 2 exemplarily illustrating a flow chart of a method for generating a multi-class classifier.

FIG. 2 is a flow diagram exemplarily illustrating a flow chart of a method for generating a multi-class classifier in accordance with embodiments of the present invention.

Specifically, at step S10, at least one one-class background classifier is generated by using a one-class object classifier and background image regions obtained from a sequence of images.

Then, at step S20, the one-class object classifier and the at least one one-class background classifier are assembled into a multi-class classifier.

The assembled multi-class classifier includes a one-class object classifier and at least one (one or more, and generally, several) one-class background classifiers. These classifiers, i.e., the one-class object classifier and the one-class background classifiers, are independent of each other. In other words, they are not mutually affected after generated and each of them can perform classification independently and individually.

So, the generated multi-class classifier according to an embodiment of the present invention is totally different from existing binary-class and multi-class classifiers, since the respective existing multi-class classifiers are only one sole classifier and each of them is not constituted by multiple one-class classifiers. In other words, each of them cannot perform classification independently and individually.

By using such generated multi-class classifier, generally, the resulting classification accuracy will be higher than any simple one-class classifier, and on the other hand, it will not worse than any binary-class classifier.

Moreover, since the respective classifiers consisting of the multi-class classifier are not mutually affected after being generated and each of them can perform classification independently and individually, it is possible to change the constitution or configuration of the multi-class classifier.

The multi-class classifier generated by using the above method for generating multi-class classifier according to this embodiment may be used to detect object in fixed scene, for example.

There are a number of methods for assembling the one-class object classifier and the at least one one-class background classifier. For an example, they can be assembled by simply adding each other, i.e., in the manner of $C_1+C_2+C_3$, provided that there are three one-class classifiers to be assembled, and $C_1$, $C_2$ and $C_3$ are the three one-class classifiers. For another example, they can be assembled by weighting the respective one-class classifiers and then adding the weighted one-class classifiers, i.e., in the manner of $\omega_1 C_1+\omega_2 C_2+\omega_3 C_3$, provided that there are three one-class classifiers to be assembled, and $C_1$, $C_2$ and $C_3$ are the three one-class classifiers.

Please note that, the method of assembling one-class object classifier and at least one one-class background classifier is not limited to the examples as illustrated above. Those skilled in the art may recognize that, there are many methods of assembling one-class object classifier and at least one one-class background classifier, and any appropriate method of assembling one-class object classifier and at least one one-class background classifier may be used in the present invention.

Here, the above-mentioned one-class object classifier may be an existing one-class object classifier, which has been generated by using appropriate method.

In addition, it may also be temporarily generated based on at least one object sample (which may be designated or input by user), before generating at least one one-class background classifier at the step S10 in FIG. 2. There are a number of methods of generating a one-class object classifier in the prior art, such as the method of Support Vector Data Description (SVDD), the methods disclosed in patent applications CN103295024A and CN103294716A etc.

Figure 3:
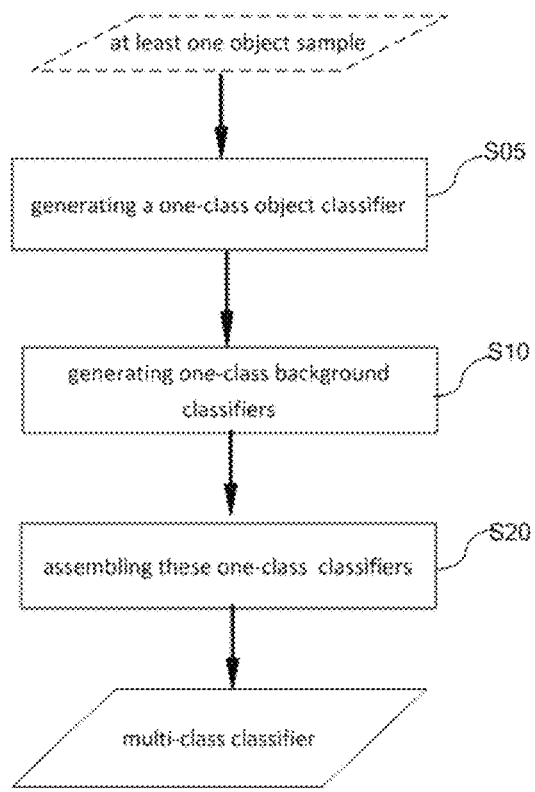
FIG. 3 exemplarily illustrating a flow chart of another method for generating a multi-class classifier.

Based on this point, FIG. 3 exemplarily illustrates a flow chart of another method for generating a multi-class classifier in accordance with an embodiment of the present invention. As shown in FIG. 3, the main difference of FIG. 3 from FIG. 2 lies in step S05. Specifically, at the step S05, a one-class object classifier is generated based on at least one object sample. The object samples may be designated or input by user, for example.

To sum up, the above-mentioned one-class object classifier may be an existing one-class object classifier or may be temporarily generated. In other words, the present invention does not intend to make any limitation to the one-class object classifier.

Figure 4:
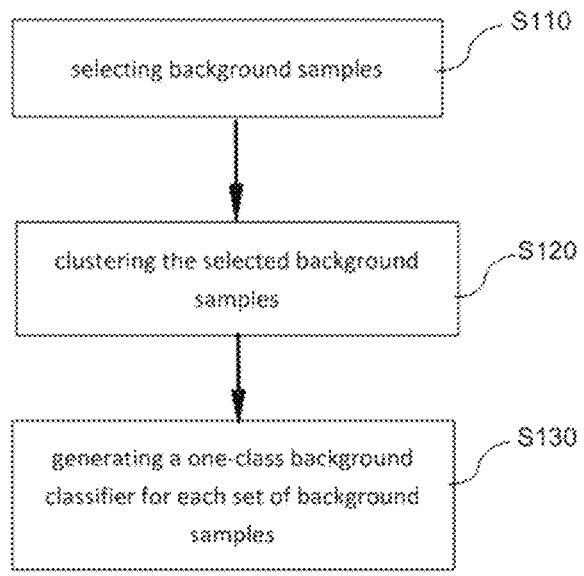
FIG. 4 illustratively shows a flow chart of an exemplary method of generating one-class background classifiers.

In addition, when generating one-class background classifiers, the following exemplary method as shown in FIG. 4 may be adopted.

Specifically, first, at step S110, using the above one-class object classifier to select background samples from background image regions.

Then, at step S120, clustering the selected background samples into at least one set of background samples.

Next, at step S130, generating a one-class background classifier for each set of background samples.

Here, any appropriate clustering method such as k-means clustering method (Brian T. Luke: "K-Means Clustering" http://fconyx.ncifcrf.gov/~lukeb/kmeans.html) may be adopted at step S120. In addition, it can be seen that, the number of generated one-class background classifier corresponds to the number of the clustered sets of background samples.

It is to be noted that, the method of generating one-class background classifiers is not limited to the above illustrative one, and any appropriate method of generating one-class background classifiers in the prior art or to be developed later may be used in the present invention.

Further, as for a background image with size 1280×720, thousands of samples can be collected by using the known sliding window method. However, it is possible that only hundreds of samples are useful for training background classifiers. The more similar the background samples are to the object (alternatively, object samples), the better the performance of a background classifier has. So, it is expected to select the background samples most similar to the object (alternatively, object samples) from the background, which may also be referred to as "hard background samples".

Figure 5:
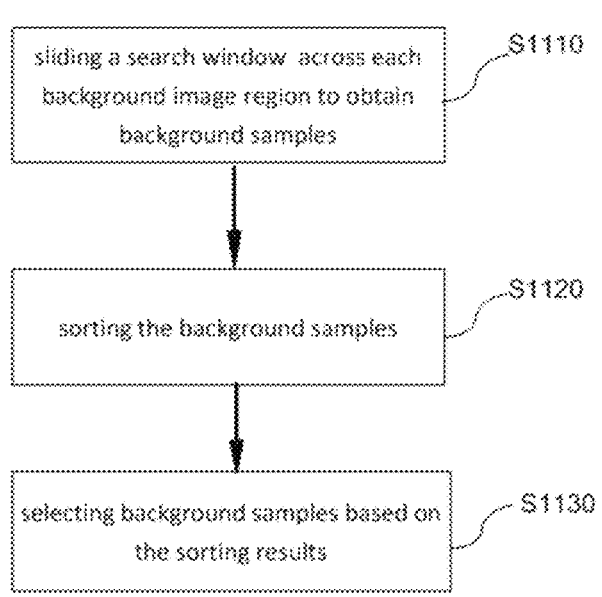
FIG. 5 illustratively shows a flow chart of an exemplary method of selecting background samples from background image regions.

For example, in the embodiment, when selecting background samples from background image regions using the one-class object classifier at step S110 as shown in FIG. 4, the following exemplary method as shown in FIG. 5 may be adopted.

As shown in FIG. 5, first, at step S1110, sliding a search window across each of the background image regions and obtaining the content in the background image region which is defined by the search window (the range limited by the local window) as a background sample.

Here, the search window adopted may be taken with several scales (one or more scales). Specifically, for example, after moving the search window around the whole input image, the input image is resized. The resizing and moving steps are repeated until a predetermined value is reached.

Then, at step S1120, sorting the background samples, based on the distances between the respective background samples and the one-class object classifier.

For example, scoring these background samples using the one-class object classifier, wherein the score is the distance from the sample to the center of one-class classifier. Here, the method of calculating the distance may be any method used to calculate the distances between vectors.

Next, at step S1130, selecting background samples based on the sorting results of the background samples.

For example, ranking these background samples in descending order and selecting some of the top background samples (for example, the top 300 background samples) as the hard background samples.

Through the above method of selecting background samples from background image regions using the one-class object classifier according to the embodiment, the processing efficiency and classification accuracy can be improved.

Here, it is to be noted that, the method of selecting background samples from background image regions using the one-class object classifier is not limited to the above illustrative one, and any appropriate method of selecting background samples from background image regions using the one-class object classifier in the prior art or to be developed later may be used in the embodiment.

Moreover, the disclosure further provides methods for updating a multi-class classifier, which will be described in detail with reference to the drawings.

Figure 6:
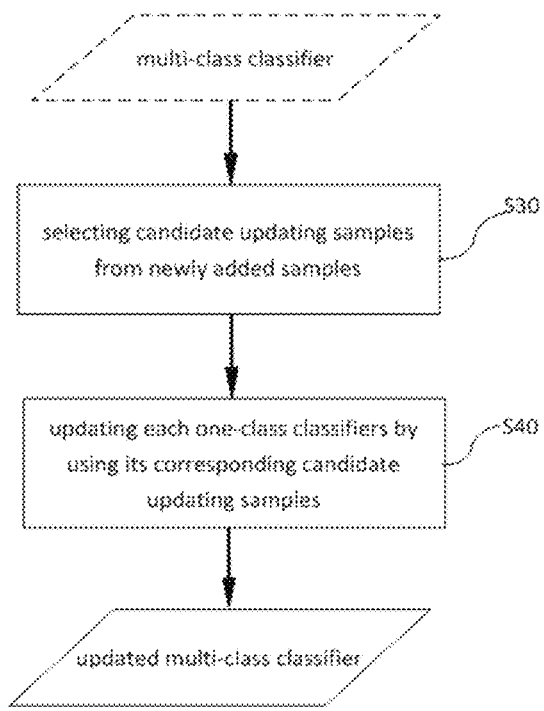
FIG. 6 illustratively shows a flow chart of an exemplary method for updating a multi-class classifier.

First, FIG. 6 illustratively shows a flow chart of an exemplary method for updating a multi-class classifier, wherein, the multi-class classifier is generated by assembling a plurality of one-class classifiers which comprise a one-class object classifier and at least one one-class background classifier.

As shown in FIG. 6, at step S30, with respect to each one-class classifier among the plurality of one-class classifiers, selecting samples from newly added samples as candidate updating samples of this one-class classifier.

Next, at step S40, updating each of the one-class classifiers by using its corresponding candidate updating samples.

Here, updating a one-class classifier may use online SVDD or any of the methods disclosed in patent application CN103294716A or any other appropriate method existing in the prior art or to be developed later.

The above method for updating a multi-class classifier according to this embodiment may be applied to scenes with slowly changing backgrounds, for example.

Further, when selecting samples from newly added samples at step S30, the following distance-based method may be adopted.

Specifically, with respect to each one-class classifier, based on the distances between the respective newly added samples and the one-class classifier, selecting candidate updating samples for this one-class classifier from newly added samples.

For example, first, selecting a one-class classifier from said multi-class classifier. Then, calculating the distance from each of said newly adding samples to said one-class classifier, and if the distance is smaller than a threshold value (which may be set in advance, for example), it will be candidate updating sample. Repeating the above steps until the operations have been performed with respect to all of the one-class classifiers in the multi-class classifier.

It is to be noted that, the above method of selecting samples from newly added samples as candidate updating sample is only illustrative. The present invention does not limit to this method, and any appropriate method of selecting samples from newly added samples that those skilled in the art could learn or to be developed later may be used in the present invention.

It is to be noted that, the above multi-class classifier to be updated may be such multi-class classifier as generated by using the method for generating a multi-class classifier according to the embodiment, or alternatively, it may be other appropriate multi-class classifier existed in the prior art or to be developed later.

Further, according to another embodiment, preferably, at least one new one-class classifier may be generated by using the samples among the newly added samples which are not candidate updating samples of the respective one-class classifiers. Moreover, the generated at least one new one-class classifier may be added to the multi-class classifier.

A newly generated one-class classifier may be a background one-class classifier, and it may also be an object one-class classifier. Generally, it is a background one-class classifier since the scenes usually vary. But, the one-class object classifier is possible to be newly generated. For example, in case where the previous one-class object classifier cannot detect object (e.g., the object being detected has changed), new one-class object classifier may be generated from at least one new object sample (which may be designated by user or be input from outside, for example).

In this manner, the methods for generating/updating multi-class classifiers according to the embodiment may suit suddenly changing scenes. That is to say, even in suddenly changing scenes, higher classification accuracy can be obtained by using the methods for generating/updating multi-class classifiers according to the embodiment.

On the other hand, in the embodiment, preferably, invalid one-class classifiers may be removed from the multi-class classifier.

Here, said invalid one-class classifiers may comprise the ones among the plurality of one-class classifiers which are less suitable for new scenes, for example. A one-class classifier less suitable for new scenes may be the oldest one-class classifier, such one-class classifiers for which no candidate updating samples can be found, useless one-class classifiers etc.

In addition, a one-class classifier to be removed may be a background one-class classifier, and it may also be an object one-class classifier, similar to the case of newly generated one-class classifier.

The method for updating a multi-class classifier according to the embodiments of the present invention not only can update each one-class classifier in the multi-class classifier, but also can update the whole multi-class classifier. If the background changes suddenly, it not only can freely select several one-class classifiers to update, but also can create some new one-class classifiers which are suitable for current background or remove some useless one-class classifiers from the assembled multi-class classifier.

Specifically, first, it may select candidate updating samples from newly adding samples for each one-class classifier in multi-classes classifier. If candidate updating samples for a certain of classifier are found, update the one-class classifier itself using candidate updating samples. Further, preferably, if there are some samples which are not candidate updating samples for any one-class classifier, update the multi-class classifier using those non-candidate updating samples.

Next, the multi-class classifier updating method according to the embodiments of the present invention may be illustrated by following expressions as an example:

1) the original multi-class classifier:

$$M = w_1 S_1 + w_2 S_2 + \ldots + w_n S_n$$

2) the updated multi-class classifier:

$$M' = w_{k+1} S_{k+1} + w_{k+2} S_{k+2} + \ldots + w_n S_n + w_{n+1} S_{n+1} + \ldots + w_{n+k} S_{n+k}$$

wherein, w is the weight of one-class classifier, n is the number of all one-class classifiers, k<n, $S_i$ (i=n+1, ..., n+k) is a new added one-class classifier. The newly added one-class classifiers are learned from non-candidate updating samples which usually come from new background. $S_j$ (j= 1, ..., k) is a removed one-class classifier. The removed one-class classifiers may be the ones not updated by any samples or may be the ones learned earliest.

Next, a detailed overall flowchart of a method for updating multi-class classifier according to another preferable embodiment of the present invention will be described with reference to FIG. 7.

Figure 7:
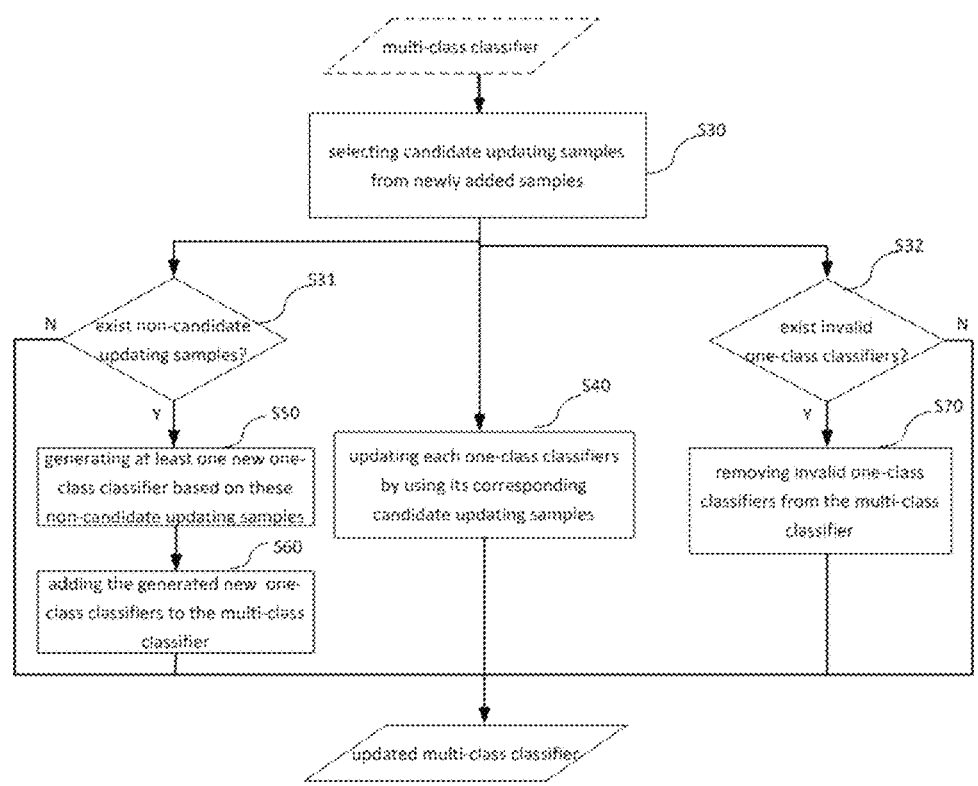
FIG. 7 illustratively shows a flow chart of another exemplary method for updating a multi-class classifier.

First, as shown in FIG. 7, at step S30, with respect to each one-class classifier among the plurality of one-class classifiers, selecting samples from newly added samples as candidate updating samples of this one-class classifier, and next, at step S40, updating each of the one-class classifiers by using its corresponding candidate updating samples, and the steps S30 and S40 are similar to those in FIG. 6.

Here, updating a one-class classifier may use online SVDD or any of the methods disclosed in patent application CN103294716A or any other appropriate method existing in the prior art or to be developed later.

At step S31, it is judged whether there are non-candidate updating samples in the newly added samples. If so, at step S50, generating at least one new one-class classifier by using the non-candidate updating samples. Then, at step S60, the generated at least one new one-class classifier is added to the multi-class classifier.

Here, the method for generating new one-class classifier may be one of those proposed in the embodiment, and it may also be one of those existing in the prior art or to be developed later. If it is judged that there are no non-candidate updating samples in the newly added samples, the operation of generating new one-class classifier will not be performed.

At step S32, it is judged whether there are invalid one-class classifiers in the multi-class classifier. If so, at step S70, removing the invalid one-class classifiers. If it is judged that there are no invalid one-class classifiers in the multi-class classifier, the operation of removing the invalid one-class classifiers will not be performed.

In this way, an updated multi-class classifier may be obtained, preferably, after re-assembling the remaining one-class classifiers.

The above method for updating a multi-class classifier according to this preferable embodiment may also be applied to scenes with slowly changing backgrounds or suddenly changing backgrounds, for example. Thus, higher classification accuracy will be obtained through using this method.

Figure 8:
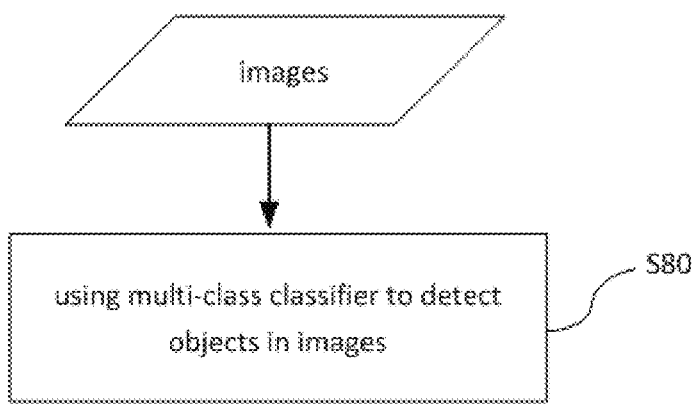
FIG. 8 illustratively shows a flow chart of an exemplary method for detecting objects.

According to another embodiment of the present invention, there is also provided a method for detecting objects by using a multi-class classifier. FIG. 8 illustratively shows a flow chart of the exemplary method for detecting objects.

Specifically, as shown in FIG. 8, at step S80, detecting objects in images by using the multi-class classifier.

Wherein, the multi-class classifier is generated by assembling a one-class object classifier and at least one one-class background classifier which can perform classifying independently of each other. The method of assembling the one-class classifiers is similar to those described above, and it is not limited in the present invention.

Here, the above multi-class classifier may be generated by using the method for generating a multi-class classifier according to the embodiment. But, the present invention does not limit to this, and any appropriate method for generating such multi-class classifier to be developed later may be used in the embodiment.

In addition, the above multi-class classifier may be updated by using the method for updating a multi-class classifier according to the embodiment. But, the present invention does not limit to this, and any appropriate method for updating such multi-class classifier existed in the prior art or to be developed later may be used in the present invention.

Figure 10:
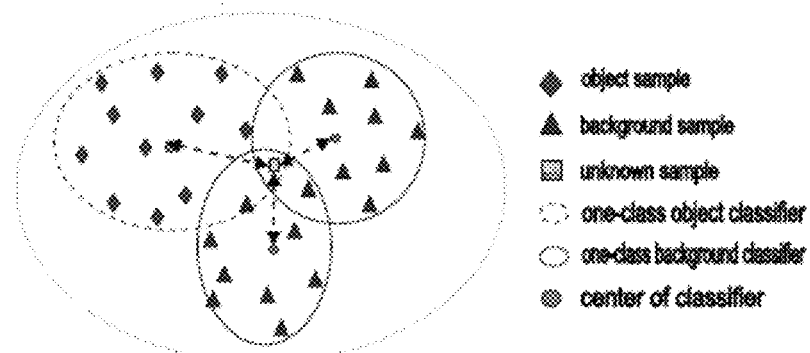
FIG. 10 illustratively shows an exemplary object detection method using multi-class classifier.

Here, an example method of detecting object in images using a multi-class classifier will be described with reference to FIG. 10.

Specifically, sliding a search window across the image to classify each such local window as object or background using multi-class classifier.

For each local window, there may be four classification results as follows.

1) If it is not detected by any one-class classifier, it is background region.

2) If it is only detected by object one-class classifier, it is object region.

3) If it is only detected by some background one-class classifiers, it is background region.

4) If it is detected by object and background one-class classifiers simultaneously, calculating the probability of belonging to each one-class classifier, and if the probability of belonging to the object one-class classifier is lowest, it is object region, or else, it is background region. Here, the probability may be the ratio of the distance from the unknown sample to the center of classifier with the radius of classifier, for example.

More specifically, an exemplary method of using the multi-class classifier to detect an object is described below.

For example, firstly, a number of partial regions are generated from the image or video frame. In one embodiment, a search window having the same size as a positive sample is set at first. Then, the search window is progressively moved across the image or video frame to extract pixels contained within the search window and create a portion of an input image. After moving the search window around the whole input image, the input image is resized. The resizing and moving steps are repeated until a predetermined value is reached. Secondly, a feature vector is extracted from each of the generated partial regions, and is inputted to the multi-class classifier. Finally, partial regions having positive samples detected therein are recorded and the sizes and locations of the object are grouped. Thus, object detection can be realized.

It is to be noted that, the method of detecting object using the multi-class classifier is not limited to those described in the embodiment, and those skilled in the art could recognize that any appropriate method in the prior art or to be developed later can be used in the present invention.

Figure 9:
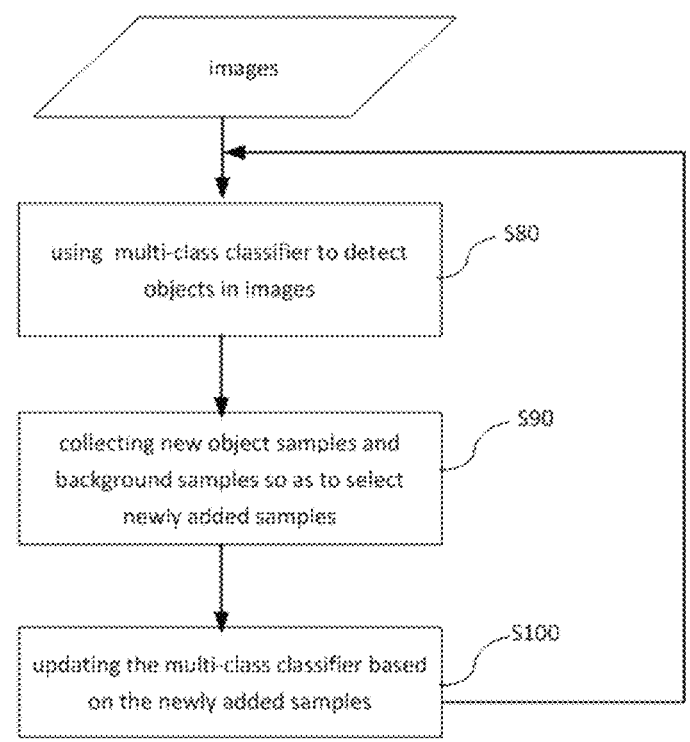
FIG. 9 illustratively shows a flow chart of another exemplary method for detecting objects.

Further, in the embodiment, it is preferable to collect new object samples and background samples from a sequence of images so as to select samples from the new object samples and background samples as newly added samples, at step S90 as shown in FIG. 9, and then update the multi-class classifier based on the newly added samples, at step S100 as shown in FIG. 9. Here, FIG. 9 illustratively shows a flow chart of another exemplary method for detecting objects.

Figure 11:
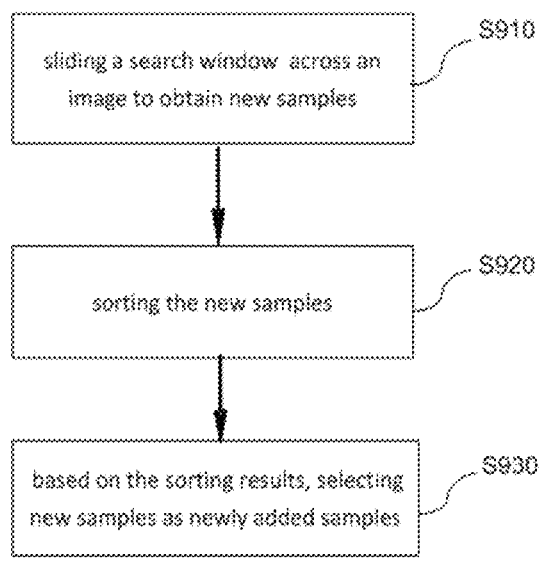
FIG. 11 illustratively shows a flow chart of an exemplary method of collecting new samples to select samples as newly added samples.

Next, an example method of collecting new object samples and background samples from a sequence of images so as to select samples from the new object samples and background samples as newly added samples will be described with reference to FIG. 11.

Specifically, at step S910, sliding a search window in at least one scale across an image and obtaining the content in the image which is defined by the search window as a new sample.

Then, at step S920, sorting the new samples, based on the distances between the respective new samples and the one-class object classifier.

Next, at step S930, selecting some samples (for example, the number may be 200) from these new samples as the newly added samples, based on the sorting results of these new samples.

It is to be noted that, the selected samples may include some samples which are not detected by any one-class classifier. Generally, these samples not detected by any one-class classifier come from new background scene, and thus they will be used to learn at least one new background classifier.

Of course, as mentioned above, new object classifier might also be learned from new object sample(s).

Through using the above methods of detecting object using background modeling according to the embodiments of the present invention which adapt to various scenes, object detection accuracy will be improved, and especially in the suddenly changing scenes, it will be greatly improved compared to conventional methods. Thus, the false detection rate will be reduced. In addition, they can not only handle with the fixed or limited background situation (just as existing background modeling methods), but also handle with changing background situation (e.g. shooting with hand-hold camera or video camera).

Figure 12:
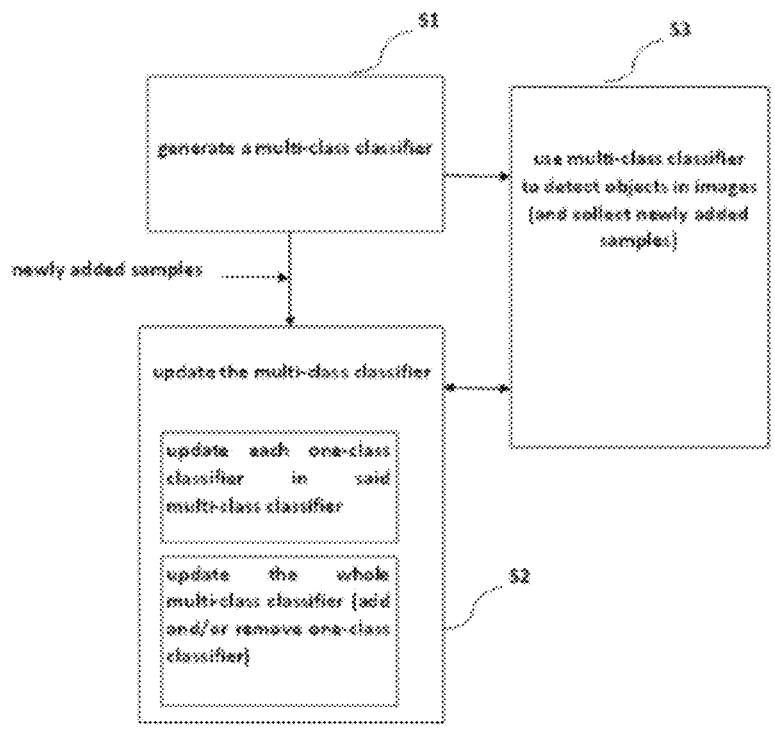
FIG. 12 illustratively shows a flow chart of an exemplary overall method which applies the present invention.

FIG. 12 illustratively shows a flow chart of an exemplary overall method which applies the present invention.

Specifically, at step S1, a multi-class classifier may be generated based on a one-class object classifier and background image regions obtained from a sequence of images by using the methods according to the embodiments of the present invention as described above.

Then, at step S2, the generated multi-class classifier may be updated by using the methods according to the embodiments of the present invention as described above.

Specifically, each one-class classifier in the multi-class classifier may be updated, and then the whole multi-class classifier may be updated by adding or removing one-class classifiers, by using the methods according to the embodiments of the present invention as described above.

Next, the generated and/or updated multi-class classifier may be used to detect object in inputted image, and simultaneously, new object and background samples may be collected as newly added samples for updating the multi-class classifier.

Therefore, at step S2, the multi-class classifier may be updated based on the newly added samples collected at step S3 or based on newly added samples input from outside.

Of course, the methods disclosed in the embodiment are not limited to be used in such one way, they can adapt to any appropriate application, and the present invention does not make any limitation to their application and/or use.

Moreover, according to another embodiment of the present invention, there is provided an apparatus for generating a multi-class classifier.

Figure 13:
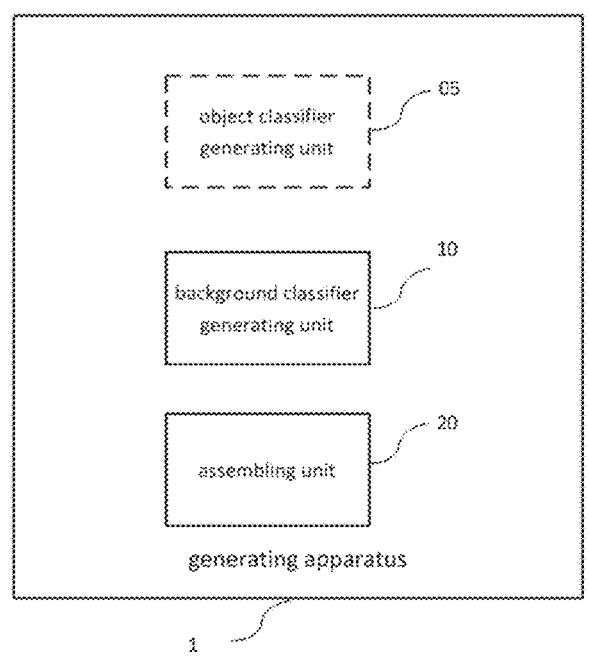
FIG. 13 illustratively shows a functional block diagram of an exemplary apparatus for generating a multi-class classifier.

FIG. 13 illustratively shows a functional block diagram of an exemplary apparatus for generating a multi-class classifier according to embodiments of the present invention.

As shown in FIG. 13, the apparatus for generating a multi-class classifier 1 may comprise: background classifier generating unit 10, which may be configured to generate at least one one-class background classifier by using a one-class object classifier and background image regions obtained from a sequence of images; and assembling unit 20, which may be configured to assemble the one-class object classifier and the at least one one-class background classifier into a multi-class classifier.

In addition, according to another embodiment of the present invention, as shown in FIG. 13, the apparatus for generating a multi-class classifier 1 may further comprise object classifier generating unit 05 which may be configured to generate the one-class object classifier.

Figure 14:
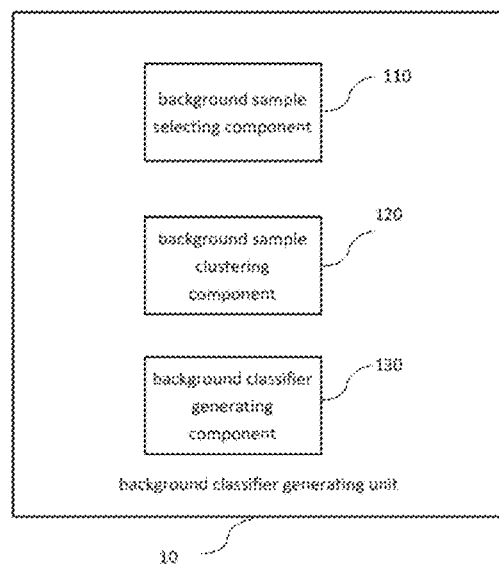
FIG. 14 illustratively shows a functional block diagram of an exemplary background classifier generating unit.

Further, for easily understanding the present invention, FIG. 14 illustratively shows a functional block diagram of an exemplary background classifier generating unit according to an embodiment of the present invention.

As shown in FIG. 14, the exemplary background classifier generating unit 10 may comprise: background sample selecting component 110, which may be configured to select background samples from background image regions using the one-class object classifier; background sample clustering component 120, which may be configured to cluster the selected background samples into at least one set of background samples; and background classifier generating component 130, which may be configured to generate a one-class background classifier for each set of background samples.

In addition, for easily understanding the present invention, the background sample selecting component according to an embodiment of the present invention may be further configured to perform the following operations to select background samples from background image regions using the one-class object classifier: first, slide a search window in at least one scale across each of the background image regions and have the content in the background image region which is defined by the search window as a background sample; and then, sort the background samples, based on the distances between the respective background samples and the one-class object classifier; and finally, select background samples based on the sorting results of the background samples.

It is to be noted that, the operations performed by the above apparatuses, units, and/or components are similar to the steps performed by those methods described above, for example, the methods for generating one-class background classifiers by using a one-class object classifier and background image regions obtained from a sequence of images, assembling the one-class classifiers, selecting background samples from background image regions using the one-class object classifier etc.

Through the apparatus for generating a multi-class classifier as described above, it may generate an assembled multi-class classifier which includes a one-class object classifier and several one-class background classifiers which are independent of each other. In other words, these classifiers are not mutually affected after being generated and each of them can perform classification independently and individually. By using such generated multi-class classifier, generally, the resulting classification accuracy will be higher than any simple one-class classifier, and on the other hand, it will not worse than any binary-class classifier.

Moreover, since the respective classifiers constituting the multi-class classifier are not mutually affected after being generated and each of them can perform classification independently and individually, it is possible to smartly change the constitution or configuration of the multi-class classifier.

Further, according to another embodiment of the present invention, there is provided an apparatus for updating a multi-class classifier.

Figure 15:
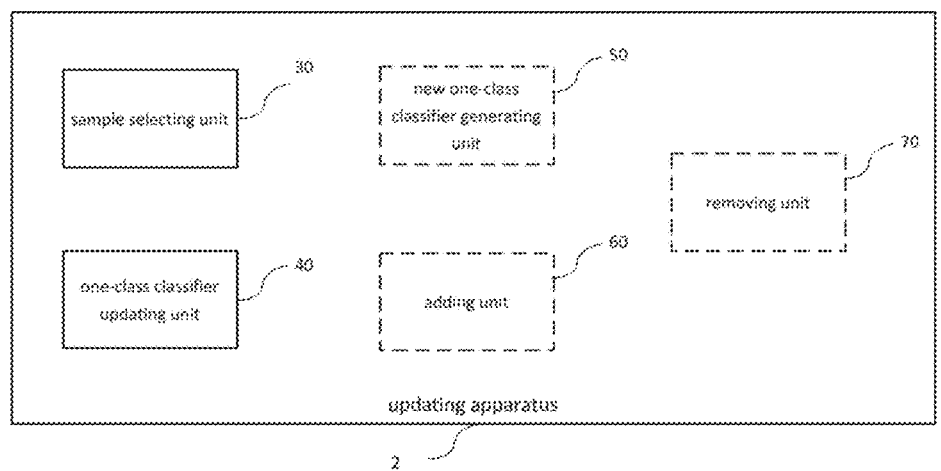
FIG. 15 illustratively shows a functional block diagram of an exemplary apparatus for updating a multi-class classifier.

FIG. 15 illustratively shows a functional block diagram of an exemplary apparatus for updating a multi-class classifier according to embodiments of the present invention.

As shown in FIG. 15, the apparatus for updating a multi-class classifier 2 may comprise: sample selecting unit 30, which may be configured to, with respect to each one-class classifier among the plurality of one-class classifiers, select samples from newly added samples as candidate updating samples of this one-class classifier; and one-class classifier updating unit 40, which may be configured to update each of the one-class classifiers by using its corresponding candidate updating samples.

In addition, according to another embodiment of the present invention, as shown in FIG. 15, the apparatus for updating a multi-class classifier 2 may further comprise: new one-class classifier generating unit 50, which may be configured to generate at least one new one-class classifier by using the samples among the newly added samples which are not candidate updating samples of the respective one-class classifiers; and adding unit 60 which may be configured to add the at least one new one-class classifier generated by the new one-class classifier generating unit to the multi-class classifier.

In addition, according to yet another embodiment of the present invention, as shown in FIG. 15, the apparatus for updating a multi-class classifier 2 may further comprise: removing unit 70, which may be configured to remove invalid one-class classifiers from the multi-class classifier. Wherein, the invalid one-class classifiers comprise the ones among the plurality of one-class classifiers which may be less suitable for new scenes, as explained above.

In addition, the sample selecting unit 30 may select candidate updating samples for each one-class classifier from newly added samples, based on the distances between the respective newly added samples and the one-class classifier.

Through the apparatus for updating a multi-class classifier as described above, it may update a multi-class classifier which is generated by assembling a plurality of one-class classifiers including a one-class object classifier and several one one-class background classifiers, based on some new samples. Furthermore, the updating of the multi-class classifier may adapt to the change of scenes and thus may improve the classification accuracy.

It is to be noted that, the operations performed by the above apparatuses, units, and/or components are similar to the steps performed by those methods described above, for example, the methods for updating one-class background classifiers, selecting samples from newly added samples as candidate updating samples, updating a one-class classifier by using its corresponding candidate updating samples, generating a new one-class classifier, selecting candidate updating samples etc.

Further, according to another embodiment of the present invention, there is provided an apparatus for detecting object.

Figure 16:
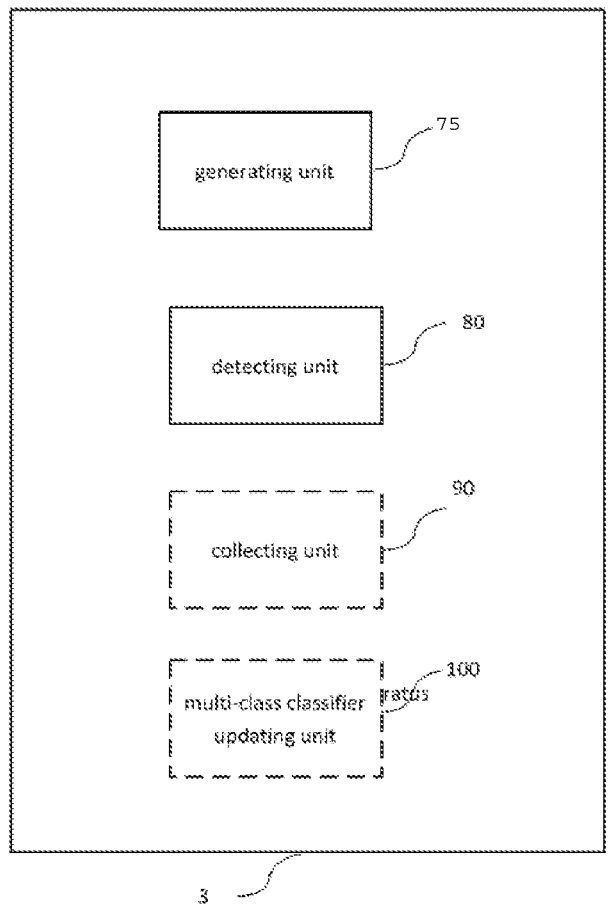
FIG. 16 illustratively shows a functional block diagram of an exemplary apparatus for detecting object.

FIG. 16 illustratively shows a functional block diagram of an exemplary apparatus for detecting object according to embodiments of the present invention.

As shown in FIG. 16, the apparatus for detecting object 3 may comprise: generating unit 75, which is configured to generate a multi-class classifier by assembling a one-class object classifier and at least one one-class background classifier which can perform classifying independently of each other; and detecting unit 80, which may be configured to detect objects in images by using a multi-class classifier.

Wherein, the generating unit 75 may be similar to the apparatus for generating a multi-class classifier 1 through assembling a one-class object classifier and at least one one-class background classifier which can perform classifying independently of each other. But, the present invention does not make any limitation to the method to be used when detecting object, and the multi-class classifier may also be generated by any other appropriate generating unit and/or method to be developed later.

Further, generating unit 75 may be included in the apparatus for detecting object 3 as one of its components, or alternatively, it may not be included therein. The present invention does not make any limitation in this point.

In addition, according to another embodiment of the present invention, as shown in FIG. 16, the apparatus for detecting object 3 may further comprise: collecting unit 90, which may be configured to collect new object samples and background samples from a sequence of images so as to select samples from the new object samples and background samples as newly added samples; and multi-class classifier updating unit 100, which may be configured to update the multi-class classifier based on the newly added samples.

In addition, according to yet another embodiment of the present invention, as shown in FIG. 16, the multi-class classifier updating unit 100 may comprise the apparatus for updating a multi-class classifier 2 as describe above. But, the present invention does not intend to make any limitation to the multi-class classifier updating unit 100.

In addition, for easily understanding the present invention, the collecting unit 90 according to an embodiment of the present invention may be further configured to perform the following operations to collect new object samples and background samples from a sequence of images so as to select samples from the new object samples and background samples as newly added samples: slide a search window in at least one scale across an image and obtaining the content in the image which is defined by the search window as a new sample; sort the new samples, based on the distances between the respective new samples and the one-class object classifier; and select samples from these new samples as the newly added samples, based on the sorting results of these new samples.

Through the apparatus for detecting object as described above, in the embodiment, it may freely add or remove any one-class classifier in a multi-class classifier which includes a one-class object classifier and several one-class background classifiers which are independent of each other.

As mentioned above, since the respective classifiers, which consist of the multi-class classifier, are not mutually affected after being generated and each of them can perform classification independently and individually, it is possible to change the constitution or configuration of the multi-class classifier. Specifically, for example, the constitution or configuration of the multi-class classifier may be changed by adding or removing one or more one-class classifiers (which may be object classifier or background classifiers).

So, the embodiment is not only suitable for the fixed background or slowly changing background, but also it is suitable for the suddenly changing background. Therefore, it can achieve better results in object detection and/or image processing.

It is to be noted that, the operations performed by the above apparatuses, units, and/or components are similar to the steps performed by those methods described above, for example, the methods for detecting object, generating a multi-class classifier, collecting new object samples and background samples from a sequence of images, updating a one-class classifier etc.

Further, according to another embodiment of the present invention, there is also provided an image processing device.

Figure 17:
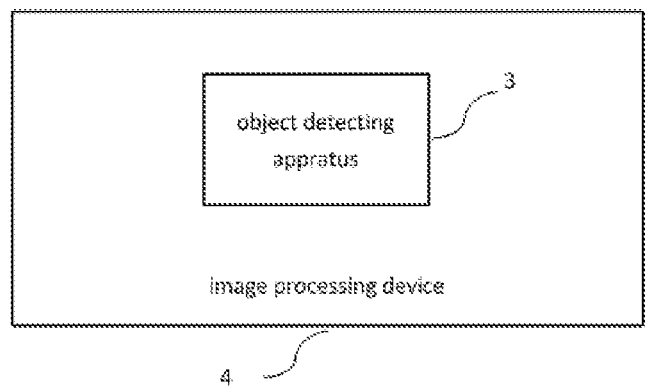
FIG. 17 illustratively shows a functional block diagram of an exemplary image processing device.

FIG. 17 illustratively shows a functional block diagram of an exemplary image processing device according to embodiments of the present invention.

As shown in FIG. 17, the image processing device 4 may comprise the apparatus for detecting objects 3 according to the embodiment.

Here, the image processing device 4 may be image shooting or pickup apparatus such as video camera, camcorder, camera, webcam, monitoring/controlling apparatus, any kind of computers, tablet, intelligent phone, game machine, alarming apparatus, or the like.

In the embodiment, novel method and apparatus for generating a multi-class classifier, novel method and apparatus for updating a multi-class classifier, and novel method and apparatus for detecting objects as well as novel image processing device are provided, which are not only suitable for fixed background or slowly changing background, but also suitable for the suddenly changing background. Therefore, by using the embodiment, excellent results can be achieved in object detection and/or image processing.

Moreover, in the embodiment, it can not only update each one-class classifier in a multi-class classifier composed of a plurality of independent one-class classifier, but also update the whole multi-class classifier, by newly adding samples. In this manner, the embodiment can significantly improve classification accuracy, and thus enhance recall rate and decrease false detection.

Result Comparison

For evaluating the present invention, online learning methods are used in the User Registered Object Detection (UROD) system. One-shot sample (teacher) of a specified object is given by user, and a one-class classifier learned from given sample by Support Vector Data Description (SVDD) is created to detect the user registered object, and the detecting of the object is performed by sliding a window across the image (possibly at multiple scales) to classify each such local window as containing the object or background. Then, the detection result is evaluated with respect to ground truth. The features for image regional description are color and Local ternary pattern (LTP).

The evaluation criteria is to use PASCAL evaluation criteria (M. Everingham, A. Zisserman, C. K. I. Williams, and L. Gool, "The PASCAL Visual Object Classes Challenge 2006 (VOC2006) Results," see http://www.pascal-network.org/challenges/VOC/voc2006/results.pdf). That is, when $$\frac{\text{Labeled region} \cap \text{Detected region}}{\text{Labeled region} \cup \text{Detected region}} > T,$$

the detected region is regarded as a correctly detected region. Here, it is assumed that T is 0.5.

In addition, the following parameters are used to evaluate the detection results.

1)

$$\text{Recall rate: } TR = \frac{\text{Detected frames}}{\text{Object frames}}$$

2) False Positive Per Image (FPPI):

$$FR = \frac{\text{False detected frames}}{\text{Total frames}},$$

wherein the false detected frames include the frames which do not contain object, but were detected.

Evaluation 1

Detection results obtained by using the method disclosed in the embodiment are compared with those obtained by using the binary-class background modeling method as disclosed by Helmut Grabner, Christian Leistner, and Horst Bischof. in the paper "Semi-Supervised On-line Boosting for Robust Tracking" (ECCV, 2008). These evaluation videos are all shot by hand-held camera. The objects to be detected are many kinds of animals such as cat, dog and so on. Each kind of animal is composed of different appearance and the background changes slowly.

Figure 18:
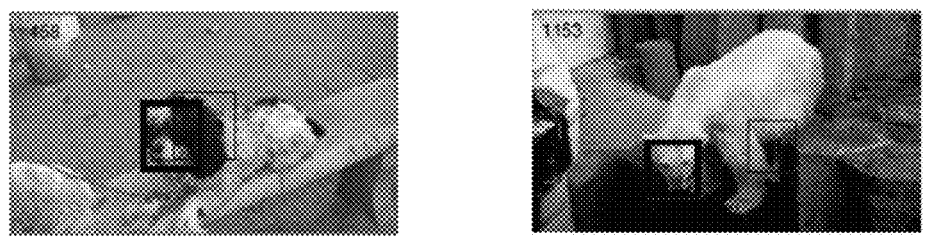
FIG. 18 shows two example frames from the test videos.

FIG. 18 shows two example frames from the test videos, wherein, detection results obtained by binary-class background modeling are represented with rectangles enclosed by thin lines, and detection results obtained by the embodiment are represented with rectangles enclosed by thick lines. From FIG. 18, it can be seen that detection results obtained by the embodiment are more accurate than those obtained by binary-class background modeling.

In addition, the whole videos are evaluated by the following three methods. Method 1 is the binary-class background modeling method in the prior art; Method 2 is a multi-class background modeling method which only updates one-class classifiers in multi-class classifier by newly adding samples, as illustrated in FIG. 6; Method 3 is a multi-class background modeling method which not only updates each one-class classifier in multi-class classifier but also updates the whole multi-class classifier, as illustrated in FIG. 7. The resulting recall rate and FPPI obtained by the above three methods are shown in Table 1.

TABLE 1

| Comparison results | | | | |
|---|---|---|---|---|
| UROD system | Total frames | Object frames | Recall rate (Detection rate) | FPPI |
| Method 1 | 167607 | 95672 | 82.02% | 0.63% |
| Method 2 | 167607 | 95672 | 90.15% | 0.58% |
| Method 3 | 167607 | 95672 | 92.97% | 0.46% |

It can be seen from the above Table 1, when the background modeling methods proposed by the embodiment (i.e., methods 2 and 3) are used for object detection, it can improve the recall rate and reduce the FPPI largely.

Evaluation 2

A video (more than 3 minutes) about a Pomeranian dog in different situation (such as backgrounds, lighting conditions etc.) is selected for evaluating the online learning methods proposed in the embodiment. In the video, the object and background change obviously. The following three methods for object detection using the background modeling method are used in UROD system. Method 1 is the binary-class background modeling method in the prior art; Method 2 is a multi-class background modeling method which only updates one-class classifiers in multi-class classifier by newly adding samples, as shown in FIG. 6; Method 3 is a multi-class background modeling method which not only updates each one-class classifier in multi-class classifier but also updates the whole multi-class classifier, as shown in FIG. 7. The detection rate and FPPI along with time are shown in FIG. 19A and FIG. 19B.

Figure 19A:
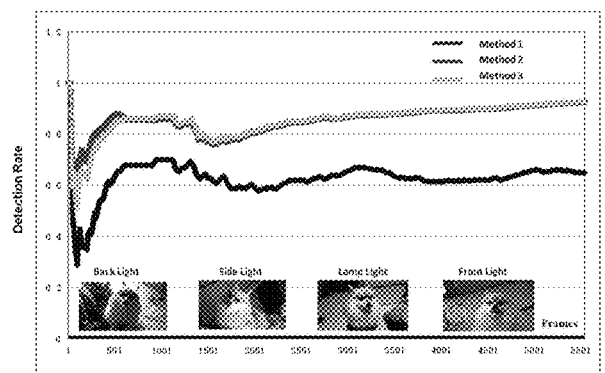
FIG. 19A and FIG. 19B show the results of the detection rate and FPPI along with time by using different methods.
Figure 19B:
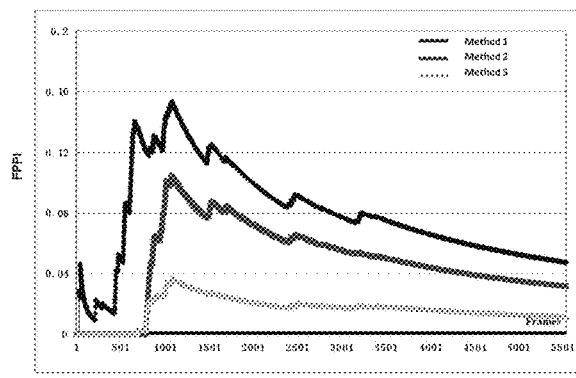

It can be seen from FIG. 19A and FIG. 19B, when the online learning methods proposed by the embodiment (methods 2 and 3) are used for object detection, they can obviously improve the detection rate and reduce the FPPI with comparison to method 1. As the new samples are added continually, method 3 further results in the FPPI significantly lower than method 2 while keeping the basically same detection rate as method 2.

In summary, the embodiment discloses online learning methods of a multi-class classifier for improving classification accuracy, and the multi-class classifier may be an assembled multi-class classifier composed of a plurality of independent one-class classifier. It can not only update each one-class classifier in multi-class classifier but also update the whole multi-class classifier. The assembled architecture of said multi-class classifier makes it very easy to be used in many applications.

Further, the embodiment also discloses a novel method for detecting object based on background modeling in order to improve the recall rate and reduce the false detection rate. It can not only handle with the fixed or limited background situations, but also handle with drastically changing background situations.

In the embodiment, novel method and apparatus for generating a multi-class classifier, novel method and apparatus for updating a multi-class classifier, and novel method and apparatus for detecting objects as well as novel image processing device are provided, which are not only suitable for fixed background or slowly changing background, but also suitable for the suddenly changing background. Therefore, by using the embodiment, excellent results can be achieved in object detection and/or image processing.

Moreover, in the embodiment, it can not only update each one-class classifier in a multi-class classifier composed of a plurality of independent one-class classifier, but also update the whole multi-class classifier, by newly adding samples. In this manner, the embodiment can significantly improve classification accuracy, and thus enhance recall rate and decrease false detection.

Please note that the above mentioned embodiments are only illustrative, and the present invention is not limited to them. Moreover, the various combinations of the aspects in the specification shall be contained in the protection scope of the present invention.

In addition, please note that it is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A method for generating a binary-class classifier for distinguishing an object with a background, comprising the following steps:
   generating a one-class object classifier using at least one object sample;
   selecting background samples from background image regions obtained from a sequence of images, using the one-class object classifier;
   clustering the selected background samples into at least one set of background samples;
   generating at least one one-class background classifier by generating a one-class background classifier for each set of background samples; and
   generating the binary-class classifier by assembling the one-class object classifier and the at least one one-class background classifier into the binary-class classifier.

2. The method according to claim 1, wherein, the step of selecting background samples comprising:
   sliding a search window in at least one scale across each of the background image regions and obtaining the content in the background image region which is defined by the search window as a background sample;
   sorting the background samples, based on the distances between the respective background samples and the one-class object classifier; and
   selecting background samples based on the sorting results of the background samples.

3. The method according to claim 1, further comprising the following steps:
   with respect to each one-class classifier among the one-class object classifier and the at least one one-class background classifier, selecting samples from newly added samples as candidate updating samples of this one-class classifier; and updating each of the one-class classifiers by using its corresponding candidate updating samples.

4. The method according to claim 3, further comprising the following step:

generating at least one new one-class classifier by using the samples among the newly added samples which are not candidate updating samples of the respective one-class classifiers; and adding the generated at least one new one-class classifier to the binary-class classifier.

5. The method according to claim 3, further comprising the following step:

removing invalid one-class classifiers from the binary-class classifier.

6. The method according to claim 3, wherein, with respect to each one-class classifier, selecting candidate updating samples for this one-class classifier from newly added samples, based on the distances between the respective newly added samples and the one-class classifier.

7. The method according to claim 1, further comprising the step of detecting an object in images by using the generated binary-class classifier.

8. The method according to claim 7, wherein, the binary-class classifier is generated by at least one one-class background classifier by using a one-class object classifier and background image regions obtained from a sequence of images; and assembling the one-class object classifier and the at least one one-class background classifier into a binary-class classifier.

9. The method according to claim 7, further comprising the following steps:

collecting new object samples and background samples from a sequence of images so as to select samples from the new object samples and background samples as newly added samples; and updating the binary-class classifier based on the newly added samples.

10. The method according to claim 9, wherein, the binary-class classifier is updated, the binary-class classifier is generated by assembling a plurality of one-class classifiers which comprise a one-class object classifier and at least one one-class background classifier, with respect to each one-class classifier among the plurality of one-class classifiers, selecting samples from newly added samples as candidate updating samples of this one-class classifier; and updating each of the one-class classifiers by using its corresponding candidate updating samples.

11. The method according to claim 9, wherein, the step of collecting new object samples and background samples from a sequence of images so as to select samples from the new object samples and background samples as newly added samples comprising:

sliding a search window in at least one scale across an image and obtaining the content in the image which is defined by the search window as a new sample;

sorting the new samples, based on the distances between the respective new samples and the one-class object classifier; and selecting samples from these new samples as the newly added samples, based on the sorting results of these new samples.

12. An apparatus for generating a binary-class classifier for distinguishing an object with a background, the apparatus comprising:

a memory;

at least one processor coupled to the memory which executes the following:

generating a one-class object classifier using at least one object sample;

selecting background samples from background image regions obtained from a sequence of images, using the one-class object classifier;

clustering the selected background samples into at least one set of background samples;

generating at least one one-class background classifier by generating a one-class background classifier for each set of background samples; and generating the binary-class classifier by assembling the one-class object classifier and the at least one one-class background classifier into the binary-class classifier.

13. The apparatus according to claim 12, wherein, the background sample selecting component is further configured to:

slide a search window in at least one scale across each of the background image regions and obtain the content in the background image region which is defined by the search window as a background sample;

sort the background samples, based on the distances between the respective background samples and the one-class object classifier; and select background samples based on the sorting results of the background samples.

14. The apparatus according to claim 12, the apparatus further comprising:

selecting, with respect to each one-class classifier among the one-class object classifier and the at least one one-class background classifier, samples from newly added samples as candidate updating samples of this one-class classifier; and updating each of the one-class classifiers by using its corresponding candidate updating samples.

15. The apparatus according to claim 14, further comprising:

generating at least one new one-class classifier by using the samples among the newly added samples which are not candidate updating samples of the respective one-class classifiers; and adding the at least one new one-class classifier to the binary-class classifier.

16. The apparatus according to claim 14, further comprising:

removing invalid one-class classifiers from the binary-class classifier.

17. The apparatus according to claim 14, wherein, candidate updating samples are selected for each one-class classifier from newly added samples, based on the distances between the respective newly added samples and the one-class classifier.

18. The apparatus according to claim 12, further comprising:

detecting an object in images by using the generated binary-class classifier.

19. The apparatus according to claim 18, wherein, the binary-class classifier is generated by using at least one one-class background classifier by using a one-class object classifier and background image regions obtained from a sequence of images; and assembling the one-class object classifier and the at least one one-class background classifier into the binary-class classifier.

20. The apparatus according to claim 18, further comprising:
collecting new object samples and background samples from a sequence of images so as to select samples from the new object samples and background samples as newly added samples; and
updating the binary-class classifier based on the newly added samples.

21. The apparatus according to claim 20, wherein, the binary-class classifier is generated by assembling a plurality of one-class classifiers which comprise a one-class object classifier and at least one one-class background classifier,
with respect to each one-class classifier among the plurality of one-class classifiers, select samples from newly added samples as candidate updating samples of this one-class classifier; and
updating each of the one-class classifiers by using its corresponding candidate updating samples.

22. The apparatus according to claim 20, wherein, the at least one processor is further configured to:
slide a search window in at least one scale across an image and obtain the content in the image which is defined by the search window as a new sample;
sort the new samples, based on the distances between the respective new samples and the one-class object classifier; and
select samples from these new samples as the newly added samples, based on the sorting results of these new samples.

* * * * *